US 12,475,787 B2

(12) United States Patent
Zhu et al.

(10) Patent No.: US 12,475,787 B2
(45) Date of Patent: Nov. 18, 2025

(54) COLLABORATIVE PERCEPTION SYSTEM FOR CREATING A COOPERATIVE PERCEPTION MAP

(71) Applicant: GM Global Technology Operations LLC, Detroit, MI (US)

(72) Inventors: Ruiyang Zhu, Ann Arbor, MI (US); Shuqing Zeng, Sterling Heights, MI (US); Mohammad Naserian, Windsor (CA); Fan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 252 days.

(21) Appl. No.: 18/521,601

(22) Filed: Nov. 28, 2023

(65) Prior Publication Data

US 2025/0174122 A1    May 29, 2025

(51) Int. Cl.
*G08G 1/0967*    (2006.01)

(52) U.S. Cl.
CPC . *G08G 1/096791* (2013.01); *G08G 1/096741* (2013.01)

(58) Field of Classification Search
CPC .......... G01S 17/06; G01S 17/86; G01S 19/45; G01S 19/47; G06F 16/29; G08G 1/0116; H04W 4/44; B60W 2554/20
See application file for complete search history.

(56) References Cited

U.S. PATENT DOCUMENTS

| | | | |
|---|---|---|---|
| 2019/0271559 A1* | 9/2019 | Colgate | G05D 1/0088 |
| 2019/0339082 A1* | 11/2019 | Doig | G01C 21/3848 |
| 2020/0219386 A1 | 7/2020 | El Assaad | |
| 2020/0278217 A1* | 9/2020 | Ahmad | G01C 21/16 |
| 2023/0093601 A1* | 3/2023 | Pendleton | G06V 20/58 |
| | | | 701/23 |
| 2025/0026379 A1* | 1/2025 | Islam | B60W 60/00274 |

OTHER PUBLICATIONS

Zhang, Qingzhao et al. "Robust Real-time Multi-vehicle Collaboration on Asynchronous Sensors," ACM MobiCom, Oct. 2023, pp. 858-872.

Xu, Jingao et al. "SwarmMap: Scaling Up Real-time Collaborative Visual SLAM at the Edge," USENIX Association, Apr. 2022, pp. 977-993.

* cited by examiner

*Primary Examiner* — Rufus C Point
(74) *Attorney, Agent, or Firm* — Vivacqua Crane, PLLC

(57) ABSTRACT

A collaborative perception system that creates a cooperative perception map based on perception data collected by a plurality of vehicles and includes one or more central computers in wireless communication with one or more controllers of each of the plurality of vehicles located in an environment containing a plurality of static roadside objects. The one or more central computers executes instructions to rank each static roadside object in the environment based on a respective utility function value and create the cooperative perception map by annotating map data of the environment based on a respective rank and geographic location of each of the static roadside objects located in the environment.

20 Claims, 3 Drawing Sheets

COLLABORATIVE PERCEPTION SYSTEM FOR CREATING A COOPERATIVE PERCEPTION MAP

INTRODUCTION

The present disclosure relates to a collaborative perception system for creating a cooperative perception map that is based on perception data collected by a plurality of vehicles.

An autonomous vehicle executes various tasks such as, but not limited to, perception, localization, mapping, path planning, decision making, and motion control. As an example, an autonomous vehicle may include perception sensors for collecting perception data regarding the environment surrounding the vehicle.

Sometimes objects located in the surrounding environment may not be seen or detected by the perception sensors corresponding to an autonomous vehicle for a variety of reasons. For example, an object may not be located within the line-of-sight of the perception sensors or may be located beyond the respective range of the perception sensor. One approach to alleviate this issue involves partial sharing of perception data between multiple vehicles under a wireless network having limited bandwidth. However, it may be challenging to seamlessly share perception data collected from multiple vehicles without experiencing artifacts created by misaligned data. This is because perception data shared between vehicles may have non-negligible amounts of misalignment due to localization error and time asynchrony. Furthermore, because network bandwidth is limited, data registration may be not used to address the data misalignment issue, since data registration requires two whole data frames.

Thus, while current perception systems achieve their intended purpose, there is a need in the art for an improved approach for sharing perception data between vehicles.

SUMMARY

According to several aspects, a collaborative perception system that creates a cooperative perception map based on perception data collected by a plurality of vehicles is disclosed. The collaborative perception system includes one or more central computers in wireless communication with one or more controllers of each of the plurality of vehicles located in an environment containing a plurality of static roadside objects. The one or more central computers execute instructions to receive an individual perception map from each of the plurality of vehicles, and determine an object set including a plurality of object identifiers, a size set including a plurality of size identifiers, and a duration set including a plurality of duration identifiers based on the individual perception maps from each of the plurality of vehicles. The one or more central computers determine a respective stability for each of the static roadside objects located in the environment based on a utility importance function that is calculated based on each of the object identifiers that are part of the object set, the largest singular size identifier that is part of the size set, and the largest singular duration identifier that is part of the duration set. The one or more central computers rank each static roadside object in the environment based on a respective utility function value, and create the cooperative perception map by annotating map data of the environment based on a respective rank and geographic location of each of the static roadside objects located in the environment.

In another aspect, the utility importance function is calculated based on a majority vote function that considers each of the object identifiers that are part of the object set, a norm function that determines the largest singular duration identifier that is part of the duration set, and a norm function that that determines the largest singular duration identifier that is part of the duration set.

In yet another aspect, the utility importance function is calculated based on the following:

$$R(o, s, t) = a * MajorityVote(o) + b * Norm(s) + c * Norm(t)$$

where $R(o, s, t)$ represents the utility importance function, o represents one of the object identifiers, s represents the largest singular size identifier that is part of the size set, t represents the largest singular duration identifier that is part of the duration set, and a, b and c each represent weights.

In an aspect, the individual perception map includes map data annotated with semantic data corresponding to each of the static roadside objects at a respective location within the environment.

In another aspect, the static roadside objects each represent an object that has a fixed geographic location within the environment.

In yet another aspect, each object identifier represents a respective static roadside object located in the environment, each size identifier represents a size of one of the respective static roadside object that are part of the object set, and each duration identifier represents a duration of time a respective static roadside objects that is part of the object set is observed by a plurality of perception sensors of a respective vehicle.

In an aspect, the stability of a respective static roadside object refers a probability of detection by a plurality of perception sensors of each of the plurality of vehicles and a likelihood the static roadside object changes a geographic location.

In another aspect, the one or more central computers execute instructions to transmit the cooperative perception map to the one or more controllers of each of the plurality of vehicles.

In yet another aspect, a collaborative perception system that creates a cooperative perception map. The collaborative perception system includes a plurality of vehicles that each include a plurality of perception sensors in electronic communication with one or more controllers, where the plurality of perception sensors corresponding to each vehicle collect perception data representing an environment containing a plurality of static roadside objects, and one or more central computers in wireless communication with the one or more controllers of each of the plurality of vehicles located in an environment containing a plurality of static roadside objects. The one or more central computers execute instructions to receive an individual perception map from each of the plurality of vehicles, and determine an object set including a plurality of object identifiers, a size set including a plurality of size identifiers, and a duration set including a plurality of duration identifiers based on the individual perception maps from each of the plurality of vehicles. The one or more central computers determine a respective stability for each of the static roadside objects located in the environment based on a utility importance function that is calculated based on each of the object identifiers that are part of the object set, the largest singular size identifier that is part of the size set, and the largest singular duration identifier that is part of the duration set. The one or more central computers rank each static roadside object in the environment based on a respective utility function value. The one or more central computers create the cooperative perception map by annotating map data of the environment based on a respective rank and geographic location for each of the static roadside objects located in the environment and transmit the cooperative perception map to the one or more controllers of each of the plurality of vehicles.

In another aspect, the one or more controllers of an ego vehicle that is part of the plurality of vehicles executes instructions to determine a subset of the static roadside objects of the cooperative perception map based on the respective rank of each static roadside object included as part of the cooperative perception map, where the subset of the static roadside objects have a minimum respective ranking.

In yet another aspect, the one or more controllers of the ego vehicle receive three-dimensional perception data collected by the plurality of perception sensors corresponding to the ego vehicle, and determine a set of three-dimensional perception points that are within a predetermined proximity to the subset of roadside objects.

In an aspect, the one or more controllers of the ego vehicle executes instructions to estimate an ego-based relative pose corresponding to the ego vehicle for each static roadside object that is part of the subset of roadside objects based on the set of three-dimensional perception points and the subset of roadside objects by executing one or more point cloud matching algorithms.

In another aspect, the one or more controllers of the ego vehicle executes instructions to receive a set of neighboring three-dimensional perception points and neighboring relative poses corresponding to a neighboring vehicle, wherein each neighboring relative pose corresponds to one of the static roadside objects that are part of the subset of roadside objects and the set of neighboring three-dimensional perception points are collected by respective perception sensors of the neighboring vehicle, execute a transform function to convert the set of three-dimensional perception points from a local coordinate system of the ego vehicle into a world coordinate system, and execute a transform function to convert the set of neighboring three-dimensional perception points from a local coordinate system of the neighboring vehicle into the world coordinate system.

In yet another aspect, the one or more controllers of the ego vehicle executes instructions to merge the set of neighboring three-dimensional perception points with the set of three-dimensional perception points based on matrix stacking to create a fused matrix.

In an aspect, the one or more controllers of the ego vehicle executes instructions to analyze the set of three-dimensional perception points and the set of neighboring three-dimensional perception points of the fused matrix based on a three-dimensional object detection model to predict one or more bounding boxes located in an immediate environment surrounding the ego vehicle, where each bounding box is representative of a corresponding dynamic object in the immediate environment.

In another aspect, the utility importance function is calculated based on a majority vote function that considers each of the object identifiers that are part of the object set, a norm function that determines the largest singular duration identifier that is part of the duration set, and a norm function that that determines the largest singular duration identifier that is part of the duration set.

In yet another aspect, the utility importance function is calculated based on the following:

$$R(o, s, t) = a * MajorityVote(o) + b * Norm(s) + c * Norm(t)$$

where R(o, s, t) represents the utility importance function, o represents one of the object identifiers, s represents the largest singular size identifier that is part of the size set, t represents the largest singular duration identifier that is part of the duration set, and a, b and c each represent weights.

In an aspect, the individual perception map includes map data annotated with semantic data corresponding to each of the static roadside objects at a respective location within the environment.

In another aspect, the static roadside objects each represent an object that has a fixed geographic location within the environment.

In yet another aspect, each object identifier represents a respective static roadside object located in the environment, each size identifier represents a size of one of the respective static roadside objects that are part of the object set, and each duration identifier represents a duration of time a respective static roadside objects that is part of the object set is observed by the plurality of perception sensors of a respective vehicle.

In an aspect, a collaborative perception system that creates a cooperative perception map is disclosed. The collaborative perception system includes a plurality of vehicles that each include a plurality of perception sensors in electronic communication with one or more controllers, where the plurality of perception sensors corresponding to each vehicle collect perception data representing an environment containing a plurality of static roadside objects, and one or more central computers in wireless communication with the one or more controllers of each of the plurality of vehicles located in an environment containing a plurality of static roadside objects, where the static roadside objects each represent an object that has a fixed geographic location within the environment. The one or more central computers execute instructions to receive an individual perception map from each of the plurality of vehicles, where the individual perception map includes map data annotated with semantic data corresponding to each of the static roadside objects at a respective location within the environment. The one or more central computers determine an object set including a plurality of object identifiers, a size set including a plurality of size identifiers, and a duration set including a plurality of duration identifiers based on the individual perception maps from each of the plurality of vehicles. The one or more central computers determine a respective stability for each of the static roadside objects located in the environment based on a utility importance function that is calculated based on each of the object identifiers that are part of the object set, the largest singular size identifier that is part of the size set, and the largest singular duration identifier that is part of the duration set. The one or more central computers rank each static roadside object in the environment based on a respective utility function value. The one or more central computers create the cooperative perception map by annotating map data of the environment based on a respective rank and geographic location for each of the static roadside objects located in the environment and transmit the cooperative perception map to the one or more controllers of each of the plurality of vehicles.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
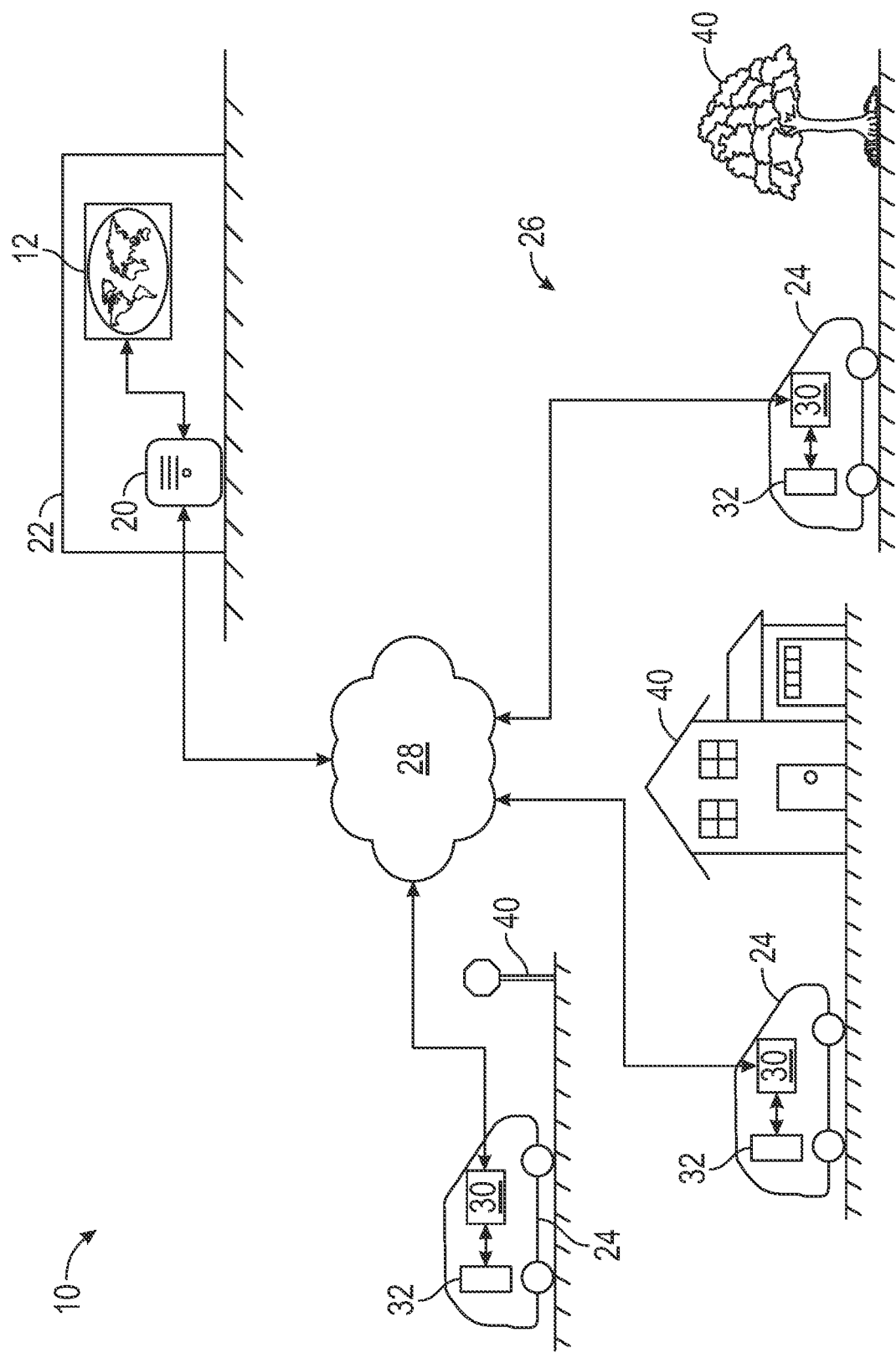
FIG. 1 illustrates a schematic diagram of the disclosed collaborative perception system including one or more central computers in wireless communication with a plurality of vehicles, according to an exemplary embodiment.

Referring to FIG. 1, an exemplary collaborative perception system 10 for creating a cooperative perception map 12 is illustrated. The collaborative perception system 10 includes one or more central computers 20 located at a back-end office 22. The one or more central computers 20 are in wireless communication with a plurality of vehicles 24 located in an environment 26 via a communication network 28. It is to be appreciated that the plurality of vehicles 24 may each be any type of vehicle such as, but not limited to, a sedan, a truck, sport utility vehicle, van, or motor home. In the non-limiting embodiment as shown in FIG. 1, each vehicle 24 includes one or more controllers 30 in electronic communication with a plurality of perception sensors 32 that collect perception data regarding the environment 26. The communication network 28 wireless connects each of the one or more controllers 30 of each vehicle 24 with the one or more central computers 20 and the one or more controllers 30 corresponding to one or more remaining vehicles 24. The perception sensors 32 corresponding to each vehicle 24 collect perception data representing the environment 26 that contains a plurality of static roadside objects 40. As explained below, the one or more central computers 20 create the cooperative perception map 12 by crowdsourcing the perception data collected by the plurality of vehicles 24 and ranking the static roadside objects 40 based on their corresponding stability.

Figure 2:
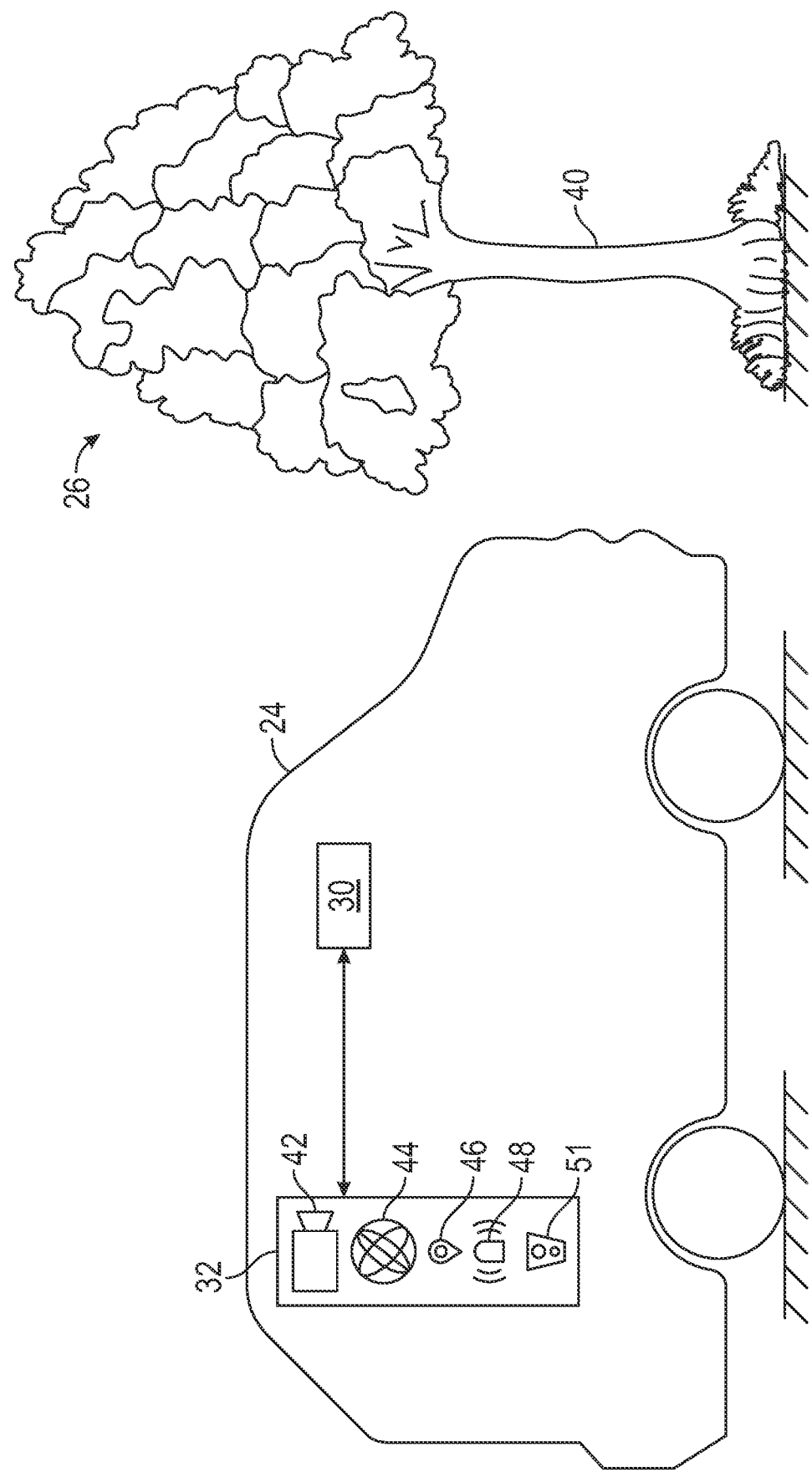
FIG. 2 is an illustration of one of the vehicles shown in FIG. 1 traveling in an environment including a static roadside object, according to an exemplary embodiment.

FIG. 2 is an illustration of one of the vehicles 24 traveling in the environment 26. In the non-limiting embodiment as shown in FIG. 2, the plurality of perception sensors 32 include one or more cameras 42 for collecting image data, an inertial measurement unit (IMU) 44, a global positioning system (GPS) 46, radar 48, and LiDAR 51, however, is to be appreciated that different or additional perception sensors may be used as well. The plurality of perception sensors 32 collect perception data representative of the environment 26 that includes the plurality of static roadside objects 40. The static roadside objects 40 represent objects that have a fixed geographic location within the environment 26. That is, the static roadside objects 40 are stationary and do not change their geographic location within the environment 26. Some examples of the static roadside objects 40 include, but are not limited to, a traffic sign, a building, a tree, and a light or utility line post.

Referring to FIGS. 1 and 2, the plurality of perception sensors 32 for each of the plurality of vehicles 24 collect perception data representative of the environment 26 that includes the plurality of static roadside objects 40. The one or more controllers 30 of each vehicle 24 each combine the perception data collected by the plurality of perception sensors 32 with map data representative of the environment 26 to create an individual perception map. In one embodiment, the map data may be high-definition map data, however, it is to be appreciated that other types of map data may be used as well. The individual perception map includes the map data representative of the environment 26 annotated with semantic data corresponding to each of the static roadside objects 40 at their respective locations, where the individual perception map is based on a world coordinate system W.

The semantic data indicates an object type, a geographic location, and the perception data corresponding to a respective roadside object 40. The object type indicates the size of the static roadside object 40, a duration of time that the static roadside object 40 was captured by the perception sensors 32. The size of the static roadside object 40 indicates the number of perception data points that are collected by the perception sensors 32 of the respective vehicle 24 or, in the alternative, the size of a bounding box that corresponds to the static roadside object 40. For example, if the environment 26 includes a traffic sign at a specified location, then the individual perception map is annotated with the sematic data representative of the traffic sign at the respective location, where the individual perception map is based on the world coordinate system W.

Continuing to refer to FIGS. 1 and 2, each of controllers 30 of the plurality of vehicles 24 may geo-hash the respective individual perception map and transmit the respective individual perception map over the communication network 28 to the one or more central computers 20. The one or more central computers 20 receive an individual perception maps from each of the plurality of vehicles 24 over the communication network 28, where each individual perception map includes map data annotated with semantic data corresponding to each of the static roadside objects 40 at their respective locations within the environment 26.

Figure 3:
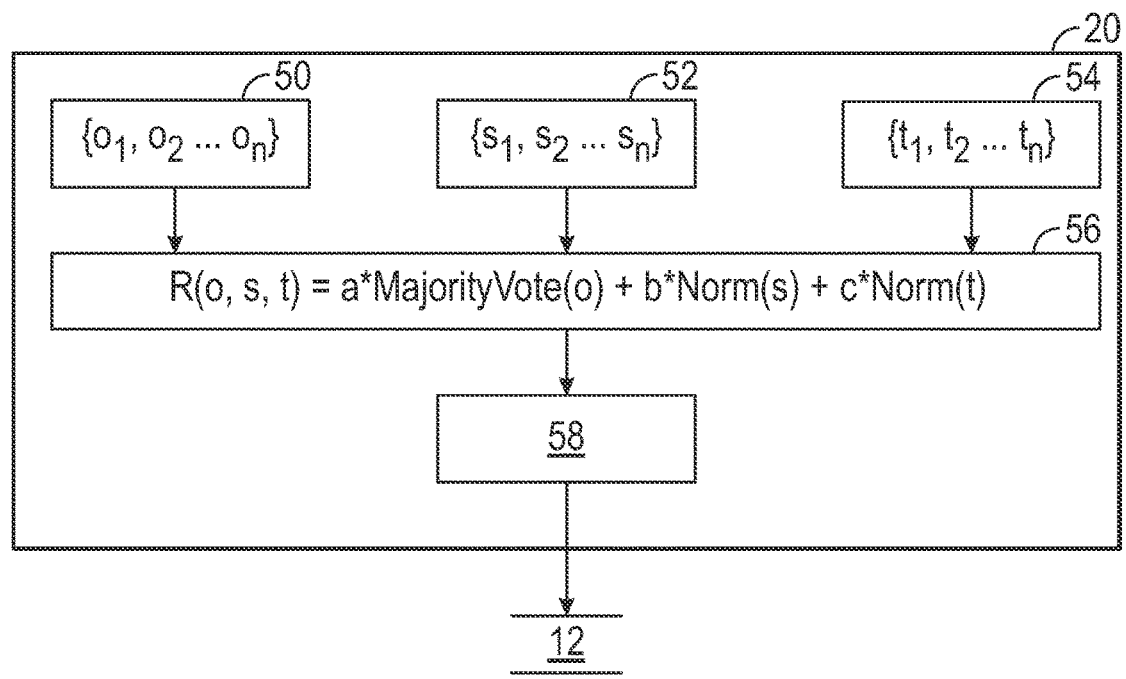
FIG. 3 illustrates the software architecture of the one or more central computers shown in FIG. 1, according to an exemplary embodiment.

FIG. 3 is a diagram illustrating the software architecture of the one or more central computers 20 shown in FIG. 1. The one or more central computers 20 include an object set block 50, a size set block 52, a duration block 54, a scoring block 56, and a ranking block 58. The object set block 50 of the one or more central computers 20 determine an object set $\{o_1, o_2, \ldots o_n\}$ based on the individual perception maps from each of the plurality of vehicles 24. The object set includes a plurality of object identifiers $o_1, o_2, \ldots o_n$ that each represent a respective static roadside object 40 located in the environment 26 (FIG. 2), where n represents the number of static roadside objects 40 located in the environment 26. The size set block 52 of the one or more central computers 20 determine a size set $\{s_1, s_2, \ldots s_n\}$ based on the individual perception maps from each of the plurality of vehicles 24. The size set includes a plurality of size identifiers $s_1, s_2, \ldots s_n$ that each represent the size of one of the respective static roadside objects 40 that are part of the object set.

The duration block 54 of the one or more central computers 20 determine a duration set $\{t_1, t_2, \ldots t_n\}$ based on the individual perception maps from each of the plurality of vehicles 24. The duration set includes a plurality of duration identifiers $t_1, t_2, \ldots t_n$ that each represent the duration of time the respective static roadside object 40 is observed by the plurality of perception sensors 32 of a respective vehicle 24. The duration block 54 compares the duration identifiers with a threshold duration of time. The threshold duration of time represents the minimum length of time that the perception sensors 32 are required to observe the respective static roadside object 40. If the respective roadside object 40 is not observed for the minimum length of time, then the perception data may not be stable.

The scoring block 56 of the one or more central computers 20 receive the object set from the object set block 50, the size set from the size set block 52, and the duration set from the duration block 54 as input and determines a respective stability for each of the static roadside objects 40 located in the environment 26. The stability of a respective static roadside object 40 refers to a probability of detection by the perception sensors 32 of each of the plurality of vehicles 24 (FIG. 1) and a likelihood the static roadside object 40 changes its corresponding geographic location.

The probability of detection is based on the visibility of the static roadside object 40 by the perception sensors 32 of each of the plurality of vehicles 24. The probability of detection is determined based on factors such as, but not limited to, an overall physical size of the static roadside object 40, a duration of time that the static roadside object 40 was detected by the perception sensors 32, and how frequently the static roadside object 40 was detected by two or more of the vehicles 24. As an example, a large building is easier for the perception sensors 32 to detect when compared to an object such as a traffic sign. The likelihood that the static roadside object 40 changes the corresponding geographic location is based on a level of difficulty of moving the geographic location of the static roadside object 40. For example, a building would have a higher level of difficultly of moving its corresponding geographic location when compared to a traffic sign or a shrub that is part of the environment 26, since is it much less difficult to move a traffic sign or a shrub when compared to a building.

The scoring block 56 determines the respective stability for each of the static roadside objects 40 located in the environment 26 based on a utility importance function. The utility importance function determines a utility function value for each of the static roadside objects 40 that are represented by an object identifier $o_1, o_2, \ldots o_n$ that is part of the object set, where a higher value indicates a higher stability. In one embodiment, the utility importance function is calculated based on a majority vote function that considers each of the object identifiers $o_1, o_2, \ldots o_n$ that are part of the object set, a norm function that determines the largest singular size identifier $s_1, s_2, \ldots s_n$ that is part of the size set, and a norm function that determines the largest singular duration identifier $t_1, t_2, \ldots t_n$ that is part of the duration set. It is to be appreciated that the size identifiers $s_1, s_2, \ldots s_n$ that are part of the size set and the duration identifier $t_1, t_2, \ldots t_n$ that is part of the duration set have a one-to-one correspondence with one of the object identifiers $o_1$, $o_2, \ldots o_n$ that are part of the object set. In one non-limiting embodiment, the utility importance function is expressed in Equation 1 as:

$$R(o, s, t) = a * MajorityVote(o) + b * Norm(s) + c * Norm(t) \quad \text{Equation 1}$$

where R(o, s, t) represents the utility importance function, o represents one of the object identifiers, s represents the largest singular size identifier that is part of the size set, t represents the largest singular duration identifier that is part of the duration set, and a, b and c each represent weights that range in value from 0 to 1, where the sum of the weights are equal to 1, or a+b+c=1. In one embodiment, the respective values for each of the weights a, b and c are determined empirically.

The ranking block 58 of the one or more central computers 20 receives the utility function value for each of the static roadside objects 40 that are part of the object set and ranks each static roadside object 40 in order based on the respective utility function value. It is to be appreciated that a higher utility function value indicates a higher stability of the respective static roadside object 40 (e.g., more data observations, or a larger overall physical size of the static roadside object 40). The ranking block 58 of the one or more central computers 20 then annotates the map data with a respective rank and the geographic location for each of the static roadside objects 40 located in the environment 26 to create the cooperative perception map 12, where the cooperative perception map 12 is expressed in the world coordinate system W. The one or more central computers 20 then transmit the cooperative perception map 12 to the one or more controllers 30 of each of the plurality of vehicle 24 over the communication network 28.

Figure 4:
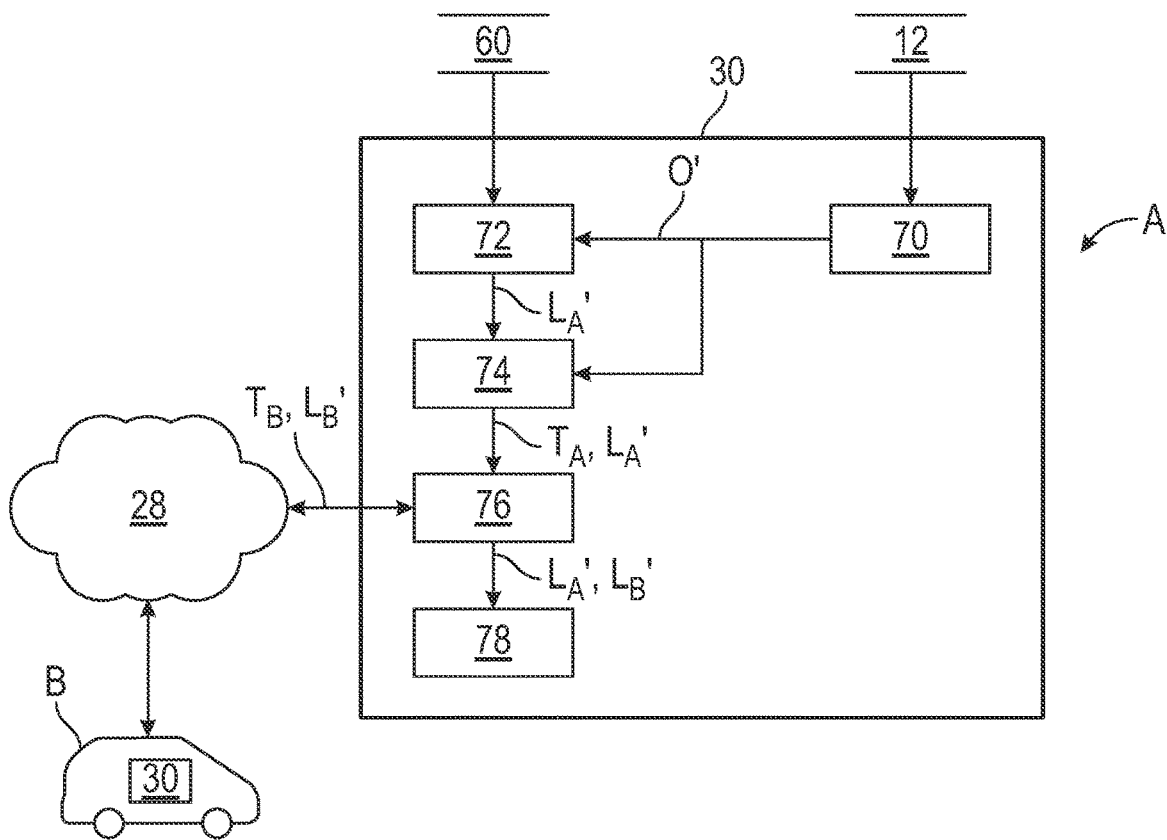
FIG. 4 illustrates the software architecture of one or more controllers that are part of one of the vehicles shown in FIG. 1, according to an exemplary embodiment.

FIG. 4 is a diagram illustrating the software architecture of the one or more controllers 30 of an ego vehicle A that is one of the plurality of vehicles 24. In the present example, the ego vehicle 24 is denoted as A and a neighboring vehicle 24 that is part of the plurality of vehicles 24 is denoted as B. The one or more controllers 30 include a subset block 70, a point cloud block 72, a relative pose block 74, a transformation block 76, and a fusion block 78. As explained below, the one or more controllers 30 of the ego vehicle A fuses together three-dimensional perception data collected by the perception sensors 32 (FIG. 2) of the ego vehicle 24 with the three-dimensional perception data collected by the perception sensors 32 of the neighboring vehicle B that is part of the plurality of vehicles 24. The three-dimensional perception data includes, but is not limited to, radar or LiDAR point clouds and image data collected from stereo or depth cameras. It is to be appreciated that while the present example describes fusing perception data between the ego vehicle A and the neighboring vehicle B, the ego vehicle A may fuse together perception data from more than one vehicle 24 as well. For example, in another embodiment, the ego vehicle A may fuse together data from another neighboring vehicle C as well.

The subset block 70 of the one or more controllers 30 of the ego vehicle A receives the cooperative perception map 12 as input and determines a subset of the static roadside objects 40 that are part of the cooperative perception map 12 based on the respective rank of each static roadside object 40 included as part of the cooperative perception map 12. It is to be appreciated that the subset of the static roadside objects 40 is denoted as O', and the entire set of static roadside objects 40 that are included in the cooperative perception map 12 is denoted as O. The subset O' of the static roadside objects 40 includes static roadside objects 40 that are part of the cooperative perception map 12 having a minimum respective ranking. The subset block 70 of the one or more controllers 30 selects the minimum respective ranking based on a computational capacity of the one or more controllers 30, where a higher computational capacity of the one or more controllers 30 results in a larger subset O'. It is to be appreciated that the subset O' of static roadside objects 40 is selected to reduce the computational load on the one or more controllers 30 of the ego vehicle A, since there may be numerous static roadside objects 40 included as part of the cooperative perception map 12.

The subset block 70 of the one or more controllers 30 of the ego vehicle A sends the subset O' of the static roadside objects 40 to the point cloud block 72 of the one or more controllers 30. The point cloud block 72 also receives the three-dimensional perception data 60 collected by the perception sensors 32 (FIG. 2) of the ego vehicle A. The point cloud block 72 then determines a set of three-dimensional perception points $L_{A'}$ that are within a predetermined proximity to the subset of roadside objects O'. It is to be appreciated that the set of three-dimensional perception points $L_{A'}$ are expressed in matrix form and are based on a local coordinate system of the ego vehicle A. For example, in one embodiment, the set of three-dimensional perception points $L_{A'}$ are expressed as a n×4 matrix. The predetermined proximity is selected to encompass three-dimensional perception data points that potentially represent one of the static roadside objects 40 that are part of the subset of roadside objects O'. It is to be appreciated that the three-dimensional perception points may not align with the static roadside objects 40 because of misalignment that is created by localization errors and deviations caused by GPS and IMU sensor deviations.

The relative pose block 74 of the one or more controllers 30 of the ego vehicle A receives the set of three-dimensional perception points $L_{A'}$ and the subset of roadside objects O' as input. The relative pose block 74 of the one or more controllers 30 estimates an ego-based relative pose $T_A$ corresponding to the ego vehicle A for each static roadside object 40 that is part of the subset of roadside objects O' based on the set of three-dimensional perception points $L_{A'}$ and the subset of roadside objects O' by executing one or more point cloud matching algorithms. The point cloud matching algorithms determine the ego-based relative pose $T_A$ for each static roadside object 40 that is part of the subset of roadside objects O' by determining a minimum distance between a transform of the set of three-dimensional perception points $L_A.T$ and a corresponding location of each static roadside object 40 that is part of the subset of roadside objects O'. One example of a point cloud matching algorithm that may be used is the normal distributions transform (NDT) algorithm. It is to be appreciated that the ego-based relative pose $T_A$ is expressed in matrix form. In one embodiment, the ego-based relative pose $T_A$ is in the form of a 4×4 matrix.

The transformation block 76 of the one or more controllers 30 of the ego vehicle A receives the ego-based relative pose $T_A$ and the set of three-dimensional perception points $L_{A'}$ for each static roadside object 40 that is part of the subset of roadside objects O'. The transformation block 76 of the one or more controllers 30 of the ego vehicle A also receives a set of neighboring three-dimensional perception points $L_{B'}$ and a set of neighboring relative poses $T_B$ corresponding to the neighboring vehicle B over the communication network 28. The neighboring relative poses $T_B$ each correspond to a static roadside object 40 that is part of the subset of roadside objects O' and the set of neighboring three-dimensional perception points $L_{B'}$ are collected by the respective perception sensors 32 (FIG. 2) of the neighboring vehicle B. It is to be appreciated that the neighboring relative pose $T_B$ and the set of neighboring three-dimensional perception points $L_{B'}$ are expressed in matrix form as well. Moreover, the neighboring relative pose $T_B$ and the set of neighboring three-dimensional perception points $L_{B'}$ are based on a local coordinate system of the neighboring vehicle B.

The transformation block 76 of the one or more controllers 30 executes a transform function to convert the set of three-dimensional perception points $L_{A'}$ from the local coordinate system of the ego vehicle A into the world coordinate system W. The transform function is a matrix multiplication function that multiplies the ego-based relative pose $T_A$ and the set of three-dimensional perception points $L_{A'}$ corresponding to each static roadside object 40 that is part of the subset of road objects O' with one another. Similarly, the transformation block 76 of the one or more controllers 30 executes a transform function to convert the set of neighboring three-dimensional perception points $L_{B'}$ from the local coordinate system of the neighboring vehicle B into the world coordinate system W.

The fusion block 78 of the one or more controllers 30 receives the the set of three-dimensional perception points $L_{A'}$ and the set of neighboring three-dimensional perception points $L_{B'}$, which are both expressed in the world coordinate system W, as input from the transformation block 76. The fusion block 78 of the one or more controllers 30 then merges the neighboring three-dimensional perception points $L_{B'}$ with the set of three-dimensional perception points $L_{A'}$ based on matrix stacking to create a fused matrix ($L_{A'}+L_{B'}$). Specifically, the matrix stacking involves concatenating a matrix representing the set of three-dimensional perception points $L_{A'}$ with a matrix representing the neighboring three-dimensional perception points $L_{B'}$ to determine the fused matrix ($L_{A'}+L_{B'}$).

The one or more controllers 30 store a three-dimensional object detection model in memory. The three-dimensional object detection model predicts one or more static roadside objects 40 located in an immediate environment surrounding the ego vehicle A based on the fused matrix ($L_{A'}+L_{B'}$). One example of a three-dimensional object detection model is the PointPillars point cloud encoder and network, however, it is to be appreciated that other three-dimensional object detection models may be used as well. The fusion block 78 of the one or more controllers 30 analyzes the set of three-dimensional perception points $L_{A'}$ and the neighboring three-dimensional perception points $L_{B'}$ of the fused matrix ($L_{A'}+L_{B'}$) based on the three-dimensional object detection model to predict one or more bounding boxes located in the immediate environment surrounding the ego vehicle A, where each bounding box is representative of a corresponding dynamic object (e.g., a vehicle, pedestrian, or cyclist) in the immediate environment. The ego vehicle A may then execute one or more perception related tasks based on the corresponding dynamic objects predicted within the immediate environment.

Referring generally to the figures, the disclosed collaborative perception system provides various technical effects and benefits. Specifically, the cooperative perception map created by the one or more central computers provides an approach to overcomes the challenges faced when attempting to share perception data collected from multiple vehicles, such as experiencing artifacts created by misaligned data. In particular, the cooperative perception map leverages crowdsourced data collected from multiple vehicles. Furthermore, because the stability of the static roadside objects are evaluated at the cloud (i.e., the one or more central computers), this allows for the vehicle controllers to consider a portion or subset of the static roadside objects based on their respective ranking, thereby reducing the computational load on the vehicle controllers.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A collaborative perception system that creates a cooperative perception map based on perception data collected by a plurality of vehicles, the collaborative perception system comprising:
   one or more central computers in wireless communication with one or more controllers of each of the plurality of vehicles located in an environment containing a plurality of static roadside objects, the one or more central computers executing instructions to:
   receive an individual perception map from each of the plurality of vehicles;
   determine an object set including a plurality of object identifiers, a size set including a plurality of size identifiers, and a duration set including a plurality of duration identifiers based on the individual perception maps from each of the plurality of vehicles;
   determine a respective stability for each of the static roadside objects located in the environment based on a utility importance function that is calculated based on each of the object identifiers that are part of the object set, the largest singular size identifier that is part of the size set, and the largest singular duration identifier that is part of the duration set;
   rank each static roadside object in the environment based on a respective utility function value; and
   create the cooperative perception map by annotating map data of the environment based on a respective rank and geographic location of each of the static roadside objects located in the environment.

2. The collaborative perception system of claim 1, wherein the utility importance function is calculated based on a majority vote function that considers each of the object identifiers that are part of the object set, a norm function that determines the largest singular duration identifier that is part of the duration set, and a norm function that that determines the largest singular duration identifier that is part of the duration set.

3. The collaborative perception system of claim 2, wherein the utility importance function is calculated based on the following:

$$R(o, s, t) = a * MajorityVote(o) + b * Norm(s) + c * Norm(t)$$

wherein R(o, s, t) represents the utility importance function, o represents one of the object identifiers, s represents the largest singular size identifier that is part of the size set, t represents the largest singular duration identifier that is part of the duration set, and a, b and c each represent weights.

4. The collaborative perception system of claim 1, wherein the individual perception map includes map data annotated with semantic data corresponding to each of the static roadside objects at a respective location within the environment.

5. The collaborative perception system of claim 1, wherein the static roadside objects each represent an object that has a fixed geographic location within the environment.

6. The collaborative perception system of claim 1, wherein each object identifier represents a respective static roadside object located in the environment, each size identifier represents a size of one of the respective static roadside object that are part of the object set, and each duration identifier represents a duration of time a respective static roadside objects that is part of the object set is observed by a plurality of perception sensors of a respective vehicle.

7. The collaborative perception system of claim 1, wherein the stability of a respective static roadside object refers a probability of detection by a plurality of perception sensors of each of the plurality of vehicles and a likelihood the static roadside object changes a geographic location.

8. The collaborative perception system of claim 1, wherein the one or more central computers execute instructions to:
   transmit the cooperative perception map to the one or more controllers of each of the plurality of vehicles.

9. A collaborative perception system that creates a cooperative perception map, the collaborative perception system comprising:
   a plurality of vehicles that each include a plurality of perception sensors in electronic communication with one or more controllers, wherein the plurality of perception sensors corresponding to each vehicle collect perception data representing an environment containing a plurality of static roadside objects; and
   one or more central computers in wireless communication with the one or more controllers of each of the plurality of vehicles located in an environment containing a plurality of static roadside objects, the one or more central computers executing instructions to:
   receive an individual perception map from each of the plurality of vehicles;
   determine an object set including a plurality of object identifiers, a size set including a plurality of size identifiers, and a duration set including a plurality of duration identifiers based on the individual perception maps from each of the plurality of vehicles;
   determine a respective stability for each of the static roadside objects located in the environment based on a utility importance function that is calculated based on each of the object identifiers that are part of the object set, the largest singular size identifier that is part of the size set, and the largest singular duration identifier that is part of the duration set;
rank each static roadside object in the environment based on a respective utility function value;
create the cooperative perception map by annotating map data of the environment based on a respective rank and geographic location for each of the static roadside objects located in the environment; and
transmit the cooperative perception map to the one or more controllers of each of the plurality of vehicles.

10. The collaborative perception system of claim 9, wherein the one or more controllers of an ego vehicle that is part of the plurality of vehicles executes instructions to:
determine a subset of the static roadside objects of the cooperative perception map based on the respective rank of each static roadside object included as part of the cooperative perception map, wherein the subset of the static roadside objects having a minimum respective ranking;
receive three-dimensional perception data collected by the plurality of perception sensors corresponding to the ego vehicle; and
determine a set of three-dimensional perception points that are within a predetermined proximity to the subset of roadside objects.

11. The collaborative perception system of claim 10, wherein the one or more controllers of the ego vehicle executes instructions to:
estimate an ego-based relative pose corresponding to the ego vehicle for each static roadside object that is part of the subset of roadside objects based on the set of three-dimensional perception points and the subset of roadside objects by executing one or more point cloud matching algorithms.

12. The collaborative perception system of claim 10, wherein the one or more controllers of the ego vehicle executes instructions to:
receive a set of neighboring three-dimensional perception points and neighboring relative poses corresponding to a neighboring vehicle, wherein each neighboring relative pose corresponds to one of the static roadside objects that are part of the subset of roadside objects and the set of neighboring three-dimensional perception points are collected by respective perception sensors of the neighboring vehicle;
execute a transform function to convert the set of three-dimensional perception points from a local coordinate system of the ego vehicle into a world coordinate system; and
execute a transform function to convert the set of neighboring three-dimensional perception points from a local coordinate system of the neighboring vehicle into the world coordinate system.

13. The collaborative perception system of claim 12, wherein the one or more controllers of the ego vehicle executes instructions to:
merge the set of neighboring three-dimensional perception points with the set of three-dimensional perception points based on matrix stacking to create a fused matrix.

14. The collaborative perception system of claim 13, wherein the one or more controllers of the ego vehicle executes instructions to:
analyze the set of three-dimensional perception points and the set of neighboring three-dimensional perception points of the fused matrix based on a three-dimensional object detection model to predict one or more bounding boxes located in an immediate environment surrounding the ego vehicle, wherein each bounding box is representative of a corresponding dynamic object in the immediate environment.

15. The collaborative perception system of claim 9, wherein the utility importance function is calculated based on a majority vote function that considers each of the object identifiers that are part of the object set, a norm function that determines the largest singular duration identifier that is part of the duration set, and a norm function that that determines the largest singular duration identifier that is part of the duration set.

16. The collaborative perception system of claim 15, wherein the utility importance function is calculated based on the following:

$$R(o, s, t) = a * MajorityVote(o) + b * Norm(s) + c * Norm(t)$$

wherein $R(o, s, t)$ represents the utility importance function, o represents one of the object identifiers, s represents the largest singular size identifier that is part of the size set, t represents the largest singular duration identifier that is part of the duration set, and a, b and c each represent weights.

17. The collaborative perception system of claim 9, wherein the individual perception map includes map data annotated with semantic data corresponding to each of the static roadside objects at a respective location within the environment.

18. The collaborative perception system of claim 9, wherein the static roadside objects each represent an object that has a fixed geographic location within the environment.

19. The collaborative perception system of claim 9, wherein each object identifier represents a respective static roadside object located in the environment, each size identifier represents a size of one of the respective static roadside object that are part of the object set, and each duration identifier represents a duration of time a respective static roadside objects that is part of the object set is observed by the plurality of perception sensors of a respective vehicle.

20. A collaborative perception system that creates a cooperative perception map, the collaborative perception system comprising:
a plurality of vehicles that each include a plurality of perception sensors in electronic communication with one or more controllers, wherein the plurality of perception sensors corresponding to each vehicle collect perception data representing an environment containing a plurality of static roadside objects; and
one or more central computers in wireless communication with the one or more controllers of each of the plurality of vehicles located in an environment containing a plurality of static roadside objects, wherein the static roadside objects each represent an object that has a fixed geographic location within the environment, the one or more central computers executing instructions to:
receive an individual perception map from each of the plurality of vehicles, wherein the individual perception map includes map data annotated with semantic data corresponding to each of the static roadside objects at a respective location within the environment;
determine an object set including a plurality of object identifiers, a size set including a plurality of size identifiers, and a duration set including a plurality of duration identifiers based on the individual perception maps from each of the plurality of vehicles;

determine a respective stability for each of the static roadside objects located in the environment based on a utility importance function that is calculated based on each of the object identifiers that are part of the object set, the largest singular size identifier that is part of the size set, and the largest singular duration identifier that is part of the duration set;

rank each static roadside object in the environment based on a respective utility function value;

create the cooperative perception map by annotating map data of the environment based on a respective rank and geographic location for each of the static roadside objects located in the environment; and transmit the cooperative perception map to the one or more controllers of each of the plurality of vehicles.

* * * * *